No. 661,574. Patented Nov. 13, 1900.
P. H. CORBETT.
QUICK RELEASING VALVE FOR AIR BRAKES.
(Application filed Aug. 7, 1900.)
(No Model.)

Witnesses
Edwin G. McKee
H. H. Timms

P. H. Corbett Inventor
by Joseph I. Krafer
Attorney

UNITED STATES PATENT OFFICE.

PERRY HUGHES CORBETT, OF HANNIBAL, MISSOURI.

QUICK-RELEASING VALVE FOR AIR-BRAKES.

SPECIFICATION forming part of Letters Patent No. 661,574, dated November 13, 1900.

Application filed August 7, 1900. Serial No. 26,196. (No model.)

*To all whom it may concern:*

Be it known that I, PERRY HUGHES CORBETT, a citizen of the United States, residing at Hannibal, in the county of Marion and State of Missouri, have invented certain new and useful Improvements in Quick-Releasing Valves for Air-Brakes; and I do hereby declare the following to be a full, clear, and exact description of the invention, such as will enable others skilled in the art to which it appertains to make and use the same.

This invention relates to an improvement in quick-releasing valves for air-brakes.

The object of the invention is to utilize the expansion of the air passed through the valve to the brake-cylinder to operate the valve and exhaust the air from the brake-cylinder when the pressure is reduced in the pipe leading to said valve.

With this and other objects in view the invention consists of certain novel features of construction and arrangement of parts hereinafter described, and pointed out in the claims.

Figure 1:
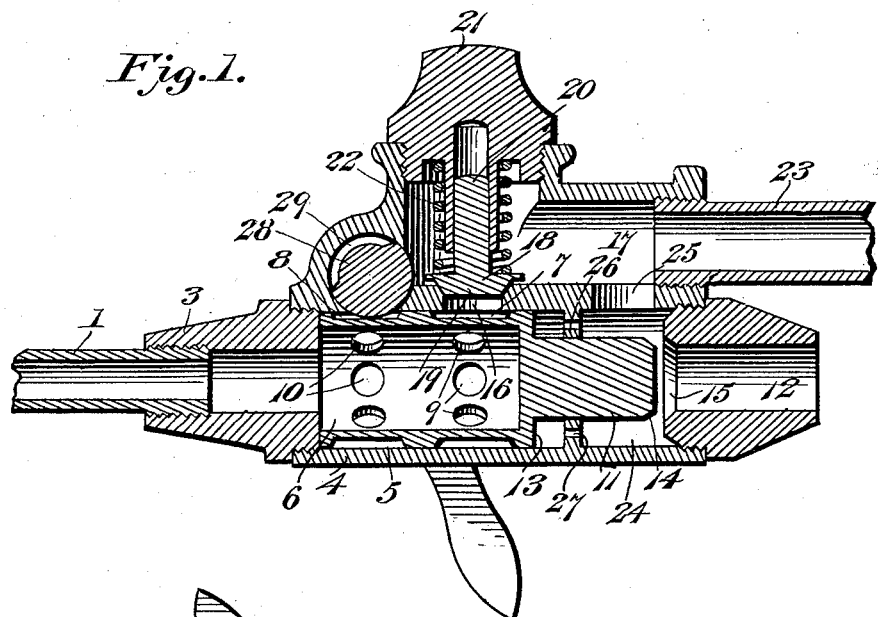
Figure 2:
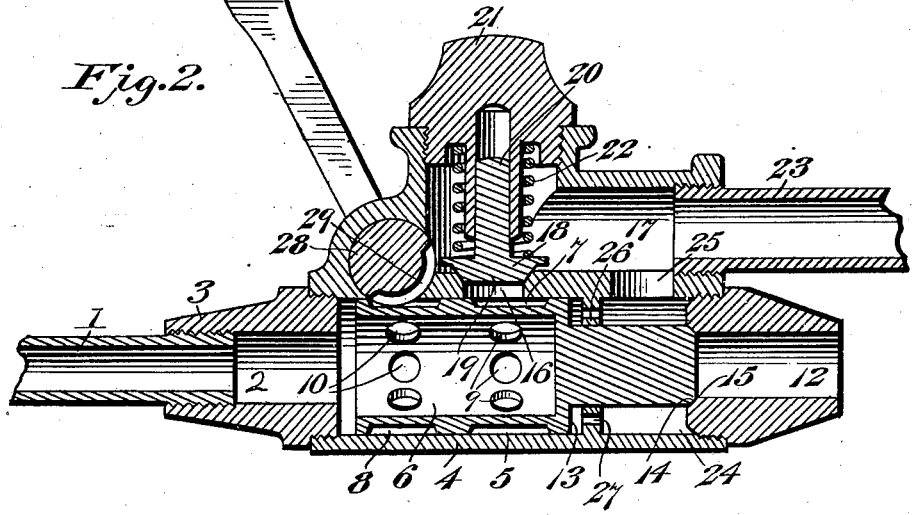

Referring to the drawings, Figure 1 is a longitudinal sectional view of the valve, showing the exhaust-passage open and the cut-out valve closed. Fig. 2 is a like view showing the exhaust-passage closed and the cut-out valve open.

1 indicates a pipe by which communication is effected from the triple valve (not shown) to the release-valve through the inlet-passage 2, said passage preferably consisting of an exteriorly and interiorly threaded bushing 3, mounted in the casing 4. After the air passes through the inlet-passage 2 it enters a piston-operating chamber 5, which has mounted therein a hollow cylindrical piston 6, closed at one end and having its wall provided with air-ports, the preferred form being in providing the exterior face of the wall of the piston with two annular grooves 7 and 8, and communicating with each of said grooves from the interior of the piston is a series of holes 9 and 10.

Attached to the piston 6 is an exhaust opening and closing member 11 for opening and closing the exhaust-passage 12, said member 11 consisting, preferably, of a cylindrical extension to the closed end of the piston 6, but being smaller in diameter than said piston to form an impact-shoulder 13 and having its free end beveled at 14 to seat itself on like side walls 15 of the exhaust-opening 12. As the air enters the piston-operating chamber it moves forward the piston, thus closing the air-exhaust passage and registering the annular groove 7 with an air-passage 16, communicating with a brake-cylinder-operating chamber 17, said passage 17 being normally closed by a valve 18. The preferred form of valve is shown, consisting of a valve-plate 19, having an upwardly-extending stem 20, and which projects into a hollow stem of a removable plug 21 in the wall of the casing 4, so that should the valve get out of order it may be taken out and repaired. Between the inside face of the plug 21 and the upper face of the valve-plate 19 is secured a spiral spring 22 for holding the valve normally closed and is opened only when the annular groove 7 registers with the air-passage 16, through which the air then passes and by way of the brake-cylinder-operating chamber and the pipe 23 to the brake-cylinder. (Not shown.)

To release the brake, the pressure is reduced in the pipe 1 in the usual way, and the air under pressure in the brake-cylinder-operating chamber, pipe 23, and brake-cylinder will enter the exhaust-chamber 24 through the passage 25.

The exhaust-chamber is separated from the piston-operating chamber by an annular flange 26, which surrounds the exhaust opening and closing member 11 and is provided with air-ports 27, communicating with the piston-operating chamber at the other side of the piston. From the exhaust-air chamber some of the air passes through the air-ports 27, and the pressure on the impact-shoulder 13 forces the piston back to its initial position, thus operating the exhaust opening and closing member and releasing the air through the exhaust-passage.

Should it be desired to cut out the device, a cut-out valve 28, having air-ports 29, is provided. Said valve when open communicates directly from the piston-operating chamber by way of the air-port 10 and the annular grooves 8 to the brake-cylinder-operating chamber.

The operation of the device may be condensed as follows: The air enters, by way of the inlet-passage 2, the piston-operating chamber and moves the piston forward, closing the exhaust-opening and registering the air-ports 9 and annular groove 7 with the air-passage 16, opens the valve 18, passes into the brake-cylinder-operating chamber, and by way of the pipe 23 to the brake-cylinder. When the pressure is reduced in pipe 1, the air from the brake-cylinder, the pipe 23, and the brake-cylinder expands and part of it passes through the air-ports 27, and the pressure on the impact-shoulders 13 forces the piston back to its initial position, thereby opening the exhaust-passage and allowing the compressed air to pass out.

Various changes in form and minor details may be made without departing from or sacrificing any advantages of this invention.

Having thus described the invention, what I claim is—

1. A release-valve comprising an inlet-passage, a piston-operating chamber, a piston mounted therein, an exhaust opening and closing member secured to the piston, a brake-cylinder-operating chamber, a valve-passage leading from the piston-operating chamber to the brake-cylinder-operating chamber, an outlet-passage, an exhaust-chamber, a passage leading from the brake-cylinder-operating chamber to the exhaust-chamber, an exhaust-passage, and air-ports leading from the exhaust-chamber to the piston-operating chamber, whereby when air passes through said ports it acts on the opposite side of the piston and returns to its initial position and opens the exhaust-passage.

2. A release-valve comprising an inlet-passage, a piston-operating chamber, a piston mounted therein, an exhaust-passage opened and closed by said piston, a brake-cylinder-operating chamber, a valved passage leading from the piston-operating chamber to the brake-cylinder-operating chamber, a cut-out valve also communicating the piston-operating chamber with the brake-cylinder-operating chamber, an outlet-passage, and a passage or passages communicating with the other side of the piston for returning it to its initial position.

3. A release-valve comprising an inlet-passage, a piston-operating chamber, a hollow cylindrical piston closed at one end and provided with one or more annular grooves and air-ports leading into said groove from the interior of the piston, a brake-cylinder-operating chamber, one or more valved passages leading from the piston-operating chamber to the brake-cylinder, an air-outlet passage, an air-exhaust passage opened and closed by the piston and a passage or passages communicating with the outer side of the piston for returning it to its initial position.

4. A release-valve comprising an inlet-passage, a piston-operating chamber, a piston mounted therein, an exhaust opening and closing member secured to the closed end of the piston and being a cylindrical extension thereof but smaller in diameter to form impact-shoulders, a brake-cylinder-operating chamber, a valved passage leading from the operating-chamber to the brake-cylinder-operating chamber, an outlet-passage, an exhaust-chamber, a passage leading from the brake-cylinder-operating chamber to the exhaust-chamber, an exhaust-passage and air-ports leading from the exhaust-chamber to the piston-operating chamber whereby when air passes through said ports it acts on the opposite side of the piston and returns to its initial position and the exhaust-passage is opened.

5. A release-valve comprising an inlet-passage, a piston-operating chamber, a hollow cylindrical piston having one end closed and its wall provided with two annular grooves and a series of holes leading from the interior of the piston to said grooves, a brake-cylinder-operating chamber, a cut-out valve communicating with the piston-operating chamber and the brake-cylinder-operating chamber, a passage connecting the piston-operating chamber and the brake-cylinder-operating chamber, a normally closed valve for the said passage, an outlet-passage, an exhaust-chamber, a passage connecting the brake-cylinder chamber and the exhaust-chamber, an exhaust-passage, an exhaust opening and closing member consisting of a cylindrical extension of the piston smaller in diameter to form an impact-shoulder and air-ports connecting the exhaust-chamber with the piston-operating chamber substantially as described.

In testimony whereof I affix my signature in presence of two witnesses.

PERRY HUGHES CORBETT.

Witnesses:
V. H. WHALEY,
R. S. TRAPIER.